(12) United States Patent
Scanlon

(10) Patent No.: US 7,712,317 B2
(45) Date of Patent: May 11, 2010

(54) FLOW CONTROL SYSTEMS

(75) Inventor: Timothy J. Scanlon, Derby (GB)

(73) Assignee: Rolls-Royce PLC, London (GB)

( * ) Notice: Subject to any disclaimer, the term of this patent is extended or adjusted under 35 U.S.C. 154(b) by 543 days.

(21) Appl. No.: 11/724,234

(22) Filed: Mar. 15, 2007

(65) Prior Publication Data
US 2007/0277888 A1    Dec. 6, 2007

(30) Foreign Application Priority Data
Apr. 13, 2006 (GB) ................... 0607443.9

(51) Int. Cl.
*F02C 7/12* (2006.01)
(52) U.S. Cl. .............. 60/806; 60/782; 60/785; 137/813; 137/812; 137/808
(58) Field of Classification Search ........... 60/782, 60/785, 806; 137/813, 812, 808
See application file for complete search history.

(56) References Cited
U.S. PATENT DOCUMENTS 3,195,303 A * 7/1965 Widell ................... 60/231
3,631,684 A    1/1972 Randall
3,641,766 A    2/1972 Uehling
5,063,733 A * 11/1991 Jackson et al. ............ 60/806

FOREIGN PATENT DOCUMENTS

| EP | 0 392 713 A1 | 10/1990 |
| EP | 0 417 940 A1 | 3/1991 |
| GB | 1 211 788 | 11/1970 |
| GB | 1 254 612 | 11/1971 |

* cited by examiner

*Primary Examiner*—Michael Cuff
*Assistant Examiner*—Craig Kim
(74) *Attorney, Agent, or Firm*—Oliff & Berridge, PLC

(57) ABSTRACT

A flow control system comprises includes a fluidic control device having a main fluid path for a flow of fluid through the device, and a control fluid path for a control flow of fluid through the device. At least part of the control fluid path coincides with at least part of the main fluid path to control the flow of fluid out of the fluidic control device. A valve is associated with the control fluid path. The valve is movable between an open condition to allow fluid to flow along the control fluid path to effect the aforesaid control of the fluid flow out of the fluidic control device, and a closed condition to inhibit or prevent fluid flow along the control fluid path.

11 Claims, 4 Drawing Sheets

FLOW CONTROL SYSTEMS

BACKGROUND

This invention relates to flow control systems. More particularly, but not exclusively, the invention relates to flow control systems for use in gas turbine engines. Embodiments of the invention relate to flow control systems for modulating secondary flow in a gas turbine engine.

In gas turbine engines, it is often necessary to be able to control a secondary fluid flow, for example in cooling air or in the flow of engine oil.

SUMMARY

According to one aspect of this invention, there is provided a flow control system comprising a fluidic control device having a main fluid path for a main flow of fluid through the device, and a control fluid path for a control flow of fluid through the device, wherein at least part of the control fluid path coincides with at least part of the main fluid path to control the flow of fluid out of the fluidic control device; and a valve associated with the control fluid path, the valve being movable between an open condition to allow fluid to flow along the control fluid path to effect the aforesaid control of the fluid flow out of the fluidic control device, and a closed condition to inhibit or prevent fluid flow along the control fluid path.

The fluidic control device may comprise a vortex amplifier. The fluidic control device may include an outlet for the fluid.

A first embodiment of the invention comprises a flow control system for use in controlling a fluid flow in a gas turbine engine.

The main fluid path of the fluid device may be arranged in fluid communication with relatively low pressure supply of fluid, such as a relatively low pressure compressor stage of a gas turbine engine. The control fluid path may be arranged in fluid communication with a relatively high pressure supply of fluid, such as a higher pressure compressor stage than the compressor stage to which the main fluid path is in fluid communication.

The outlet of the fluidic control device may be in fluid communication with a turbine or compressor region of the gas turbine engine to provide cooling air thereto. A first fluidic control device may be provided at the compressor, and a second fluidic control device may be provided at the turbine. The valve may be associated with the first and second fluidic control devices.

The flow control system may comprise a plurality of fluidic control devices. The fluidic control devices may be a plurality of the second fluidic control devices, which may be arranged around the turbine.

A plurality of the second fluidic control devices may be arranged generally circumferentially around a rotary component of a gas turbine engine, such as a turbine. The second embodiment may include a manifold to supply the control fluid to the second fluidic control devices.

The flow control system may be used to control flow in the oil system of a gas turbine engine. The main flow path may be in fluid communication with a bearing chamber of the oil system. The control fluid path may be in fluid communication with a source of gas, for example air from a compressor of the gas turbine engine.

Preferably, the main fluid path is in fluid communication with a vent of the bearing chamber.

BRIEF DESCRIPTION OF THE DRAWINGS

Embodiments of the invention will now be described by way of example only, with reference to the accompanying drawings, in which.

DETAILED DESCRIPTION OF EMBODIMENTS

Figure 1:
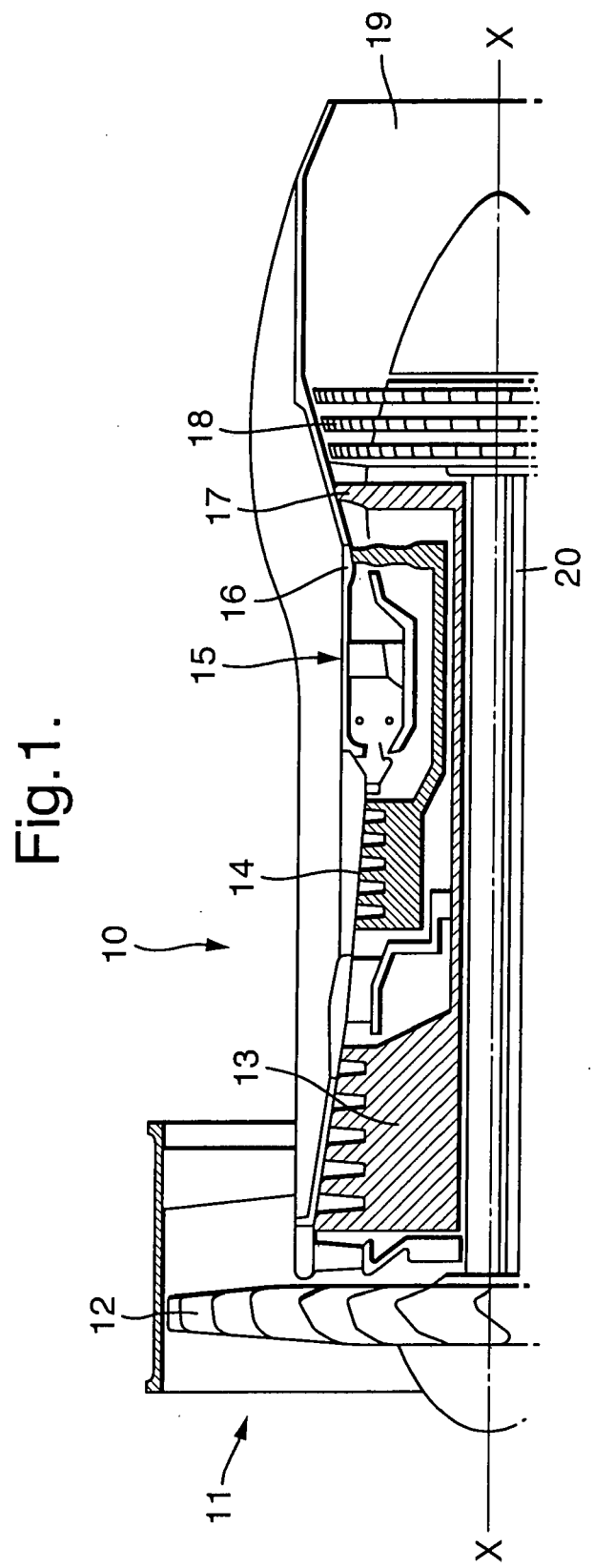
FIG. 1 is a diagrammatic sectional side view of the upper half of the gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts 20.

At various positions throughout the engine 10, there are secondary fluid flows, for example in supplying cooling fluid to the turbines 16, 17, 18 and in oil system flows. These flows of secondary fluid need to be modulated depending upon the operating conditions of the engine 10.

Figure 2:
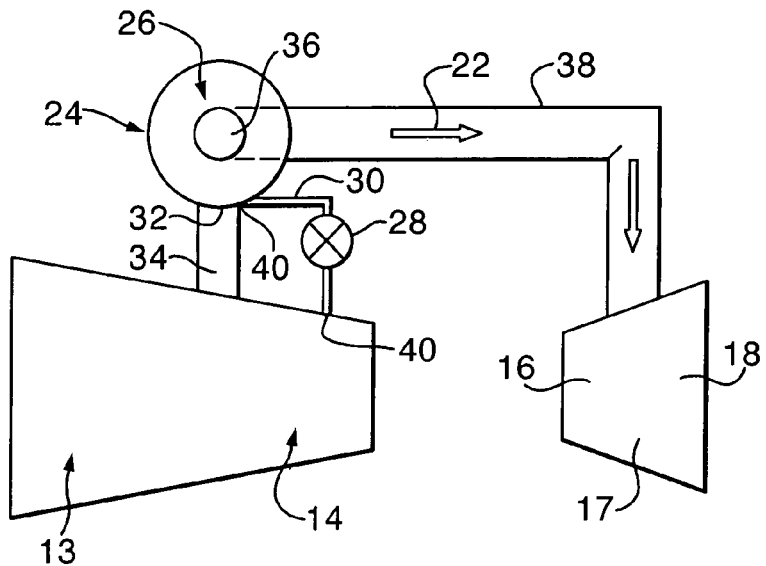
FIG. 2 is a diagrammatic view of a first embodiment of a flow control system for use in the turbine engine shown in FIG. 1.

FIG. 2 shows a diagrammatic view of a cooling system supplying cooling air from the compressor stages 13, 14 to the turbine stages 16, 17, 18 in order to cool the components of the turbine stages. The compressor stages 13, 14 and the turbine stages 16, 17, 18 are shown diagrammatically in FIG. 2.

In order to control the flow of a cooling fluid 22 to the turbines 16, 17, 18, a flow control system 24 is provided. The flow control system 24 comprises a fluidic control device in the form of a vortex amplifier 26 and a valve 28 to supply a control fluid via a control conduit 30 to the vortex amplifier 26. The vortex amplifier 26 includes a main inlet 32 to which air from the compressor stage, 13, 14 is supplied by a feed conduit 34.

Under normal operating conditions, the air passing into the fluidic control device 26 passes out of an outlet 36 and along a main conduit 38 to the turbine stages 16, 17, 18.

The air supplied to the feed conduit 34 is supplied from a lower pressure region of the compressor stages 13, 14 than the air supplied to the value 28. The control conduit 30 is connected to the high pressure compressor stage 14 via the valve 28.

As can be seen, the control fluid conduit 30 extends to a control inlet 40 of the fluidic control device 26. When the value 28 is opened, air from the high pressure compressor stage 14 enters the fluidic control device 26 generally tangentially thereto, and impinges upon the main flow of fluid entering the vortex amplifier 26 via the main inlet 32.

As the valve 28 is further opened, the flow of air from the high pressure compressor stage 14 into the vortex amplifier 26 via the control fluid conduit 30 increases in pressure until the pressure of the fluid along the control fluid conduit 30 exceeds the pressure of the air entering the vortex amplifier 26 via the main inlet 32. As a result, the flow of air through the vortex amplifier 26 starts to form a vortex. This results in the rate of flow of the air out of the vortex 36 reducing. As the pressure of the flow of air through the control conduit 30 increases, the formation of the vortex also increases until, with a high enough pressure of air flowing along the control conduit 30, the flow of air through the main inlet 32 is cut off.

Figure 3:
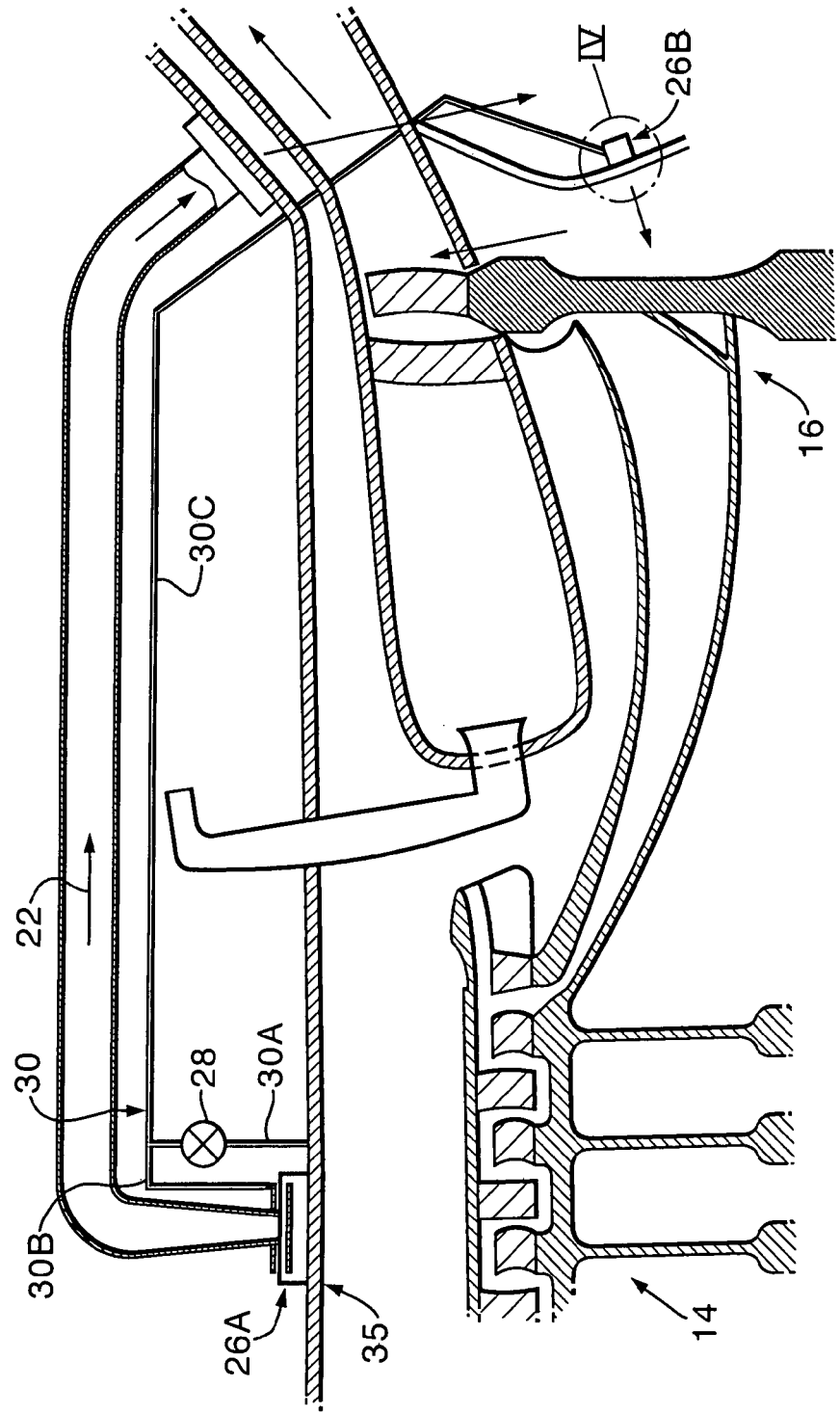
FIG. 3 is a diagrammatic view of a further embodiment of a flow control system for use in the turbine engine shown in FIG. 1.
Figure 4:
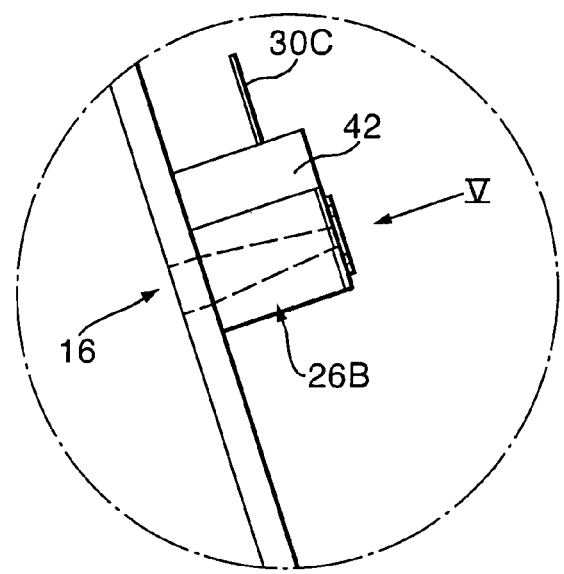
FIG. 4 is a view of the region marked IV in FIG. 3.
Figure 5:
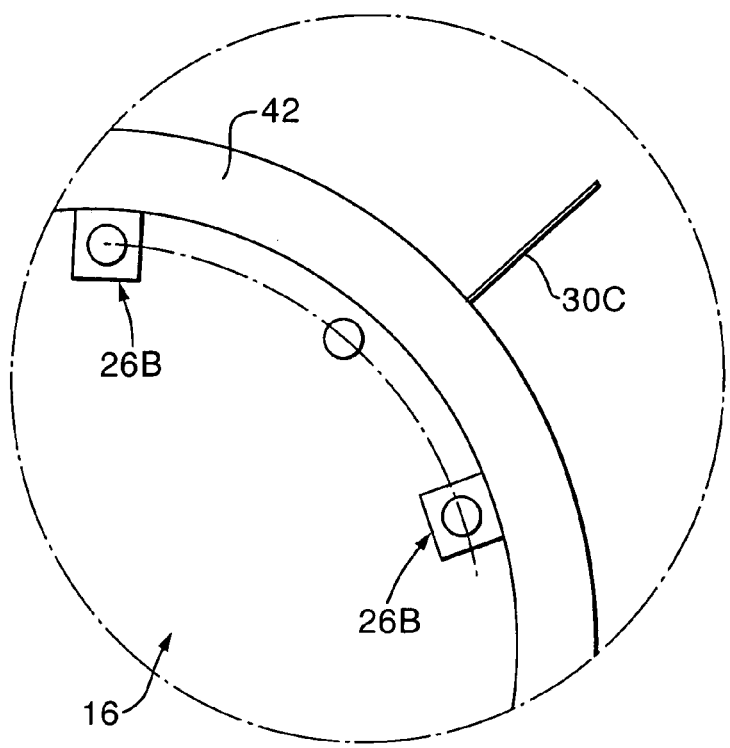
FIG. 5 is a partial view along the line V in FIG. 4.

A further embodiment is shown in FIG. 3 which comprises first and second vortex amplifiers 26A, 26B. The first vortex amplifier 26A is arranged in or on a casing 35 surrounding the high pressure compressor stage 14. The second vortex amplifier 26B is provided at the high pressure turbine stage 16. The second vortex amplifier 26B comprises a plurality of vortex amplifiers arranged around the turbine casing in a circumferentially spaced relationship (see FIG. 5). Each of the circumferentially spaced second vortex amplifiers 26B is in fluid communication with a circumferentially extending manifold 42 to receive the control fluid therefrom. The control conduit 30 extends to the manifold 42.

The arrangement shown in FIG. 3 comprises an upstream pipe 30A of the control conduit 30. The upstream pipe 30A is arranged upstream of the valve 28 and extends from the compressor 14 to the valve 28. The control conduit 30 also includes first and second downstream pipes 30B, 30C extending respectively from the valve 28 to the first vortex amplifier 26A and to the second vortex amplifiers 26B. Thus the control fluid is fed from the compressor 14 to the first vortex amplifier 26A integral with the casing of the compressor 14 and to the second vortex amplifiers 26B on the turbine 16.

The first vortex amplifier 26A in the embodiment shown in FIG. 3 also receives fluid from the high pressure compressor 14, but from a stage that is at a lower pressure than the stage feeding compressed air to the control conduit 30. Under normal operating conditions, the fluid flows from the first fluid control device 26A via the main conduit 38 to the manifold 42 to be fed to the second fluid control device 26B. The flow of cooling fluid 22 from the compressor 14 to the turbine 16 is controlled at two regions, the first being at the compressor 14 and the second being at the turbine 16.

Figure 6:
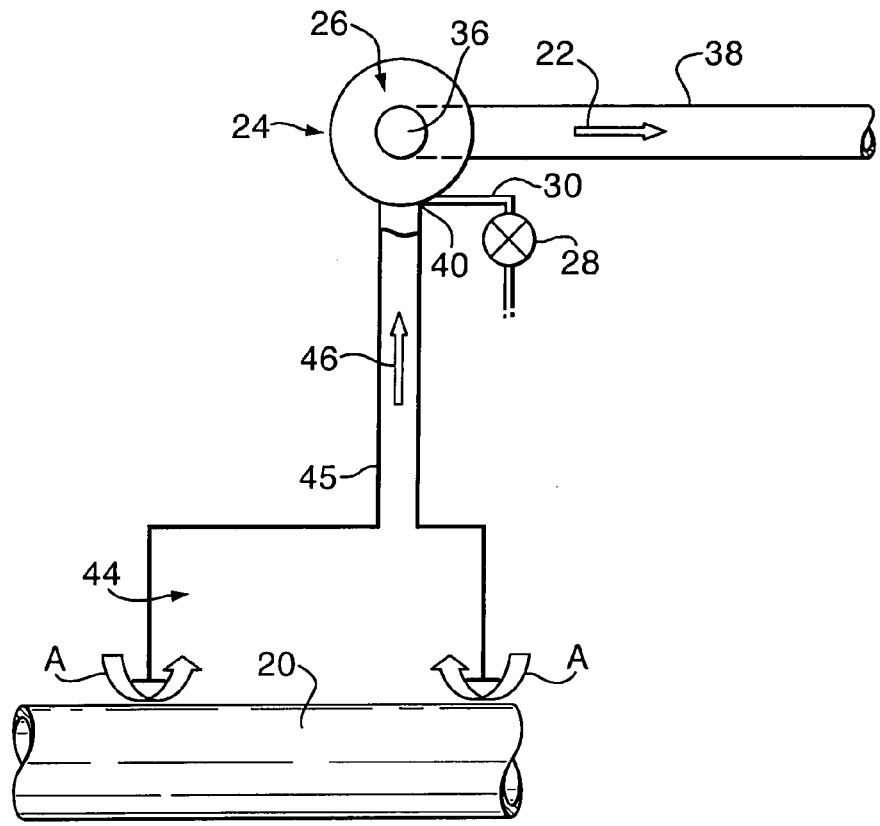
FIG. 6 is a diagrammatic view of a further embodiment of a flow control system.

A further embodiment is shown in FIG. 6 in which the fluid flow control system 24 is mounted on a bearing chamber 44 of the oil system of the gas turbine engine 10. The bearing chamber 44 has a vent conduit 45 upon which the flow control system 24 is mounted.

The control conduit 30 feeding the control fluid to the vortex amplifier 26 is in fluid communication with a source of air, such as the high pressure compressor 14. A mixture of air and oil from the bearing chamber at 44 passes along the vent conduit 45 to the vortex amplifier 26, as shown by the arrow 46. This mixture enters the vortex amplifier 26 via the main inlet 32. In normal operation, the mixture of oil and air then passes out of the outlet aperture 36 and along the outlet conduit 38. This condition is generally obtained when the engine 10 is operating at low power, thereby maximising the pressure drop across the bearing chamber seals.

When the engine is running at high power, the valve 28 is moved to its open condition. Compressed air from the high pressure compressor 14 flows along the control flow conduit 30 into the vortex amplifier 26 via the control flow inlet 40 to impinge upon the mixture of air and oil entering via the main inlet 32. A vortex within the vortex amplifier 26 starts to form. The flow of the air and oil mixture into the vortex amplifier 26 along the vent conduit 45 is thus stopped.

As the power of the engine increases, the valve 28 is opened further to increase the pressure of the flow along the control conduit 30 thereby increasing the vortex within the vortex amplifier 26 until none of the oil and air mixture passes out of the vortex amplifier 26 along the outlet conduit 38.

In this condition, there is no further flow of air and oil along the vent conduit 45 which restricts the flow of air leaking into the bearing chamber, as shown by the arrows A.

Although embodiments of the present invention have been described in the preceding paragraphs with reference to various examples, it should be appreciated that modifications to the invention can be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A flow control system comprising:
    a fluidic control device having a main fluid path for a main flow of fluid through the device, and a control fluid path for a control flow of fluid through the device, wherein at least part of the control fluid path coincides with at least part of the main fluid path to control a flow of fluid out of the fluidic control device, and the main fluid path of the fluidic control device is arranged in fluid communication with a relatively low pressure compressor stage of a gas turbine engine and the control fluid path is arranged in fluid communication with a relative high pressure stage or a turbine of the gas turbine engine; and
    a valve associated with the control fluid path, the valve being movable between an open condition to allow fluid to flow along the control fluid path to effect the aforesaid control of the fluid flow out of the fluidic control device, and a closed condition to inhibit or prevent fluid flow along the control fluid path.

2. The flow control system according to claim 1 wherein the fluidic control device comprises a vortex amplifier including an outlet for the fluid.

3. The flow control system according to claim 1 wherein an outlet of the fluidic control device is in fluid communication with a turbine or compressor region of the gas turbine engine to provide cooling air thereto.

4. A gas turbine engine incorporating a flow control system as claimed in claim 1.

5. A flow control system comprising:
    a first fluidic control device provided at a compressor of a gas turbine engine; a second fluidic control device provided a turbine of the gas turbine engine, each fluidic control device including a main fluid path for a main flow of fluid through the device, and a control fluid path for a control flow of fluid through the device, wherein at least part of the control fluid path coincides with at least part of the main fluid path to control the flow of fluid out of the device; and a valve associated with the first and the second fluidic control devices, the valve being movable between an open condition to allow fluid to flow along the control fluid paths to effect the aforesaid control of the fluid flow out of each fluidic control device, and a closed condition to inhibit or prevent fluid flow along the control fluid paths of each fluidic control device.

6. The flow control system according to claim 5 wherein the flow control system comprises a plurality of fluidic control devices, arranged around a rotary component of the gas turbine engine.

7. The flow control system according to claim 6 wherein the plurality of the fluidic control devices are arranged generally circumferentially around the turbine of the gas turbine engine, and the flow control system further includes a manifold to supply the control fluid to the second fluidic control devices device.

8. A flow control system comprising:

a fluidic control device having a main fluid path for a main flow of fluid through the device, and a control fluid path for a control flow of fluid through the device, wherein at least part of the control fluid path coincides with at least part of the main fluid path to control the flow of fluid out of the fluidic control device; and a valve associated with the control fluid path, the valve being movable between an open condition to allow fluid to flow along the control fluid path to effect the aforesaid control of the fluid flow out of the fluidic control device, and a closed condition to inhibit or prevent fluid flow along the control fluid path, wherein the flow control system is a rotary component of a gas turbine engine used to control flow in an oil system of the gas turbine engine, the main fluid path being in fluid communication with a chamber of the oil system, and the control fluid path being in fluid communication with a source of gas.

9. The flow control system according to claim 8 wherein the source of gas comprises air from a compressor of a gas turbine engine.

10. The flow control system according to claim 8 wherein the main fluid path is in fluid communication with a vent of the chamber.

11. The flow control system according to claim 8 wherein the chamber comprises a bearing chamber.

* * * * *